(12) United States Patent
Joao et al.

(10) Patent No.: US 7,818,551 B2
(45) Date of Patent: Oct. 19, 2010

(54) FEEDBACK MECHANISM FOR DYNAMIC PREDICATION OF INDIRECT JUMPS

(75) Inventors: Jose A Joao, Austin, TX (US); Onur Mutlu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 390 days.

(21) Appl. No.: 11/967,336

(22) Filed: Dec. 31, 2007

(65) Prior Publication Data

US 2009/0172371 A1    Jul. 2, 2009

(51) Int. Cl.
G06F 9/32 (2006.01)
(52) U.S. Cl. .................................................. 712/233
(58) Field of Classification Search .................. None
See application file for complete search history.

(56) References Cited

U.S. PATENT DOCUMENTS

| | | | |
|---|---|---|---|
| 5,923,863 | A | 7/1999 | Adler et al. |
| 5,956,758 | A | 9/1999 | Henzinger et al. |
| 6,237,077 | B1 | 5/2001 | Sharangpani et al. |
| 6,367,004 | B1 * | 4/2002 | Grochowski et al. ........ 712/226 |
| 6,754,812 | B1 | 6/2004 | Abdallah et al. |
| 6,988,183 | B1 | 1/2006 | Wong |
| 7,051,193 | B2 | 5/2006 | Wang et al. |
| 7,085,919 | B2 | 8/2006 | Grochowski et al. |
| 7,178,011 | B2 | 2/2007 | Seal et al. |
| 7,210,025 | B1 | 4/2007 | Uht et al. |
| 2007/0288730 | A1 * | 12/2007 | Luick ........................ 712/235 |
| 2010/0095102 | A1 * | 4/2010 | Toyoshima et al. ......... 712/233 |

OTHER PUBLICATIONS

Kim et al. (Diverge-Merge Processor (DMP): Dynamic Predicated Execution of Complex Control-flow Graphs Based on Frequently Executed Paths); MICRO'06; 2006; 12 pages.*
Klauser et al. (Klauser) (Selective Eager Execution on the PolyPath Architecture); Proceedings of the 25th annual international symposium on Computer architecture (ISCA '98); pp. 250-259; Year of Publication: 1998.*
Pagiamtzis et al. (Pagiamtzis) (Content-Addressable Memory (CAM) Circuits and Architectures: A Tutorial and Survey); IEEE Journal of Solid-State Circuits, vol. 41, No. 3, Mar. 2006, pp. 712-727.*
Joao et al. (Joao) (Dynamic Predication of Indirect Jumps); IEEE Computer Architecture Letters, May 2007, 4 pages.*

(Continued)

*Primary Examiner*—Eddie P Chan
*Assistant Examiner*—Keith Vicary
(74) *Attorney, Agent, or Firm*—Turocy & Watson, LLP (57) ABSTRACT

Systems and methods are provided to detect instances where dynamic predication of indirect jumps (DIP) is considered to be ineffective utilizing data collected on the recent effectiveness of dynamic predication on recently executed indirect jump instructions. Illustratively, a computing environment comprises a DIP monitoring engine cooperating with a DIP monitoring table that aggregates and processes data representative of the effectiveness of DIP on recently executed jump instructions. Illustratively, the exemplary DIP monitoring engine collects and processes historical data on DIP instances, where, illustratively, a monitored instance can be categorized according to one or more selected classifications. A comparison can be performed for currently monitored indirect jump instructions using the collected historical data (and classifications) to determine whether DIP should be invoked by the computing environment or whether to invoke other indirect jump prediction paradigms.

20 Claims, 8 Drawing Sheets

OTHER PUBLICATIONS

Heil et al. (Selective Dual Path Execution) Technical Report, University of Wisconsin, Madison, Nov. 1996., 29 pages.*

Jacobsen et al. (Assigning Confidence to Conditional Branch Predictions); Proceedings of the 29th annual ACM/IEEE international symposium on Microarchitecture; pp. 142-152; Year of Publication: 1996.*

Grunwald et al. (Confidence Estimation for Speculation Control) ; Proceedings of the 25th annual international symposium on Computer architecture (ISCA '98); pp. 122-131.*

Klauser et al. (Dynamic Hammock Predication for Non-predicated Instruction Set Architectures); Proceedings of the 1998 International Conference on Parallel Architectures and Compilation Techniques; 8 pages.*

Kim (Adaptive Predication via Compiler-Microarchitecture Cooperation); Dissertation at UT: Austin, Aug. 2007, 192 pages.*

Joao et al. (Improving the Performance of Object-Oriented Languages with Dynamic Predication of Indirect Jumps); ASPLOS 2008, Mar. 1-5, 2008, pp. 80-90.*

Tyson et al. (Limited Dual Path Execution); CSE-TR 346-97, University of Michigan, 1997; 14 pages.*

Ahuja et al. (Multipath Execution: Opportunities and Limits); In Proceedings of the 1998 International Conference on Supercomputing, Jul. 1998; 8 pages.*

Tang et al. (RIMP: Runtime Implicit Predication); APPt 2005, LNCS 3756, pp. 71-80, 2005.*

Klauser et al. (Selective Branch Inversion: Confidence Estimation for Branch Predictors) ; International Journal of Parallel Programming, vol. 29, No. 1, 2001, 30 pages.*

Belgaumkar (General Dynamic Predication for SuperScalar Processors) ; Thesis at the Michigan Technological University, 2003; 64 pages.*

Farooq et al. (Value Based BTB Indexing for Indirect Jump Prediction); The 16th International Symposium on High-Performance Computer Architecture. Jan. 2010; 11 pages.*

Hyesoon Kim, et al. Wish Branches: Combining Conditional Branching and Predication for Adaptive Predicated Execution http://131.107.65.76/~onur/pub/kim_micro05.pdf. Last accessed Oct. 1, 2007, 12 pages.

Po-Yung Chang, et al. Target Prediction for Indirect Jumps. ISCA '97, Denver, CO, USA. ACM 0-89791-901-7/97/0006 http://ieeexplore.ieee.org/iel3/4807/13287/00604707.pdf?tp=&isnumber=13287&arnumber=604707. Last accessed Oct. 3, 2007, 10 pages.

Hyesoon Kim, et al. Profile-assisted Compiler Support for Dynamic Predication in Diverge-Merge Processors https://research.microsoft.com/~onur/pub/kim_cgo07.pdf. Last accessed Oct. 3, 2007, 12 pages.

* cited by examiner

FEEDBACK MECHANISM FOR DYNAMIC PREDICATION OF INDIRECT JUMPS

BACKGROUND

Indirect jump instructions are commonly employed in the increasing number of programs written in object-oriented languages such as C#, Java, and C++. To support polymorphism, these languages include virtual function calls that are implemented using indirect jump instructions in the instruction set architecture of a microprocessor. In addition to virtual function calls, indirect jumps are commonly used in the implementation of programming language constructs such as switch-case statements, jump tables, and interface calls.

Current pipelined processors fall short in predicting the target address of an indirect jump if multiple different targets are exercised at run-time. Such hard-to-predict indirect jumps not only limit processor performance and cause wasted energy consumption but also contribute significantly to the performance difference between traditional and object-oriented languages. A contemplated solution to this shortcoming was to handle indirect jumps by dynamically predicating them. However, dynamic predication of an indirect jump instruction can sometimes degrade performance if predication is not useful.

Current pipelined processors can use branch prediction to improve performance. In practice, predicting a branch instruction correctly allows the processor to continue fetching instructions to fill a microprocessor pipeline without interruptions. Even though branch mispredictions are infrequent with state-of-the-art branch predictors, they are a performance bottleneck because they force the processor to flush the pipeline and restart fetching from the correct path. Also, a result of current practices is energy consumption by the operative microprocessors that, with current practices, are tasked to handle a large number of wrong path instructions. In many cases, a significant portion of the flushed instructions are on the correct path, i.e., control independent instructions that should be executed no matter which direction the branch takes. Therefore, with current solutions, the processor could end up fetching and executing mostly the same instructions after a branch misprediction.

Indirect jumps are control instructions that can be succeeded by a large number of possible next instructions (targets). Operatively, the actual target depends on data that may only be known at runtime. Currently, indirect jumps are predicted using a Branch Target Buffer (BTB), which, operatively, stores the last taken target of every control instruction. However, if the indirect jump has multiple targets that are interleaved at runtime, the BTB-based prediction can generally provide an incorrect prediction. More sophisticated indirect jump predictors have been proposed and deployed to overcome this limitation. Such predictors consider the branch or path history in addition to the address of the jump to produce a more accurate prediction. However, the accuracy of indirect jump predictors is still below that of conditional branch predictors because indirect jumps are inherently more difficult to predict: conditional branches can only have two outcomes (taken or not-taken), while indirect jumps can exercise many targets at runtime.

Traditionally, predication has been proposed as a compiler technique that eliminates conditional branches by converting control dependencies to data dependencies. Operatively, those instructions whose predicate is resolved to be true commit their results to the architectural (software-visible) state of the program. Predicated-false instructions do not change the architectural state (i.e., become no operations (NOPs)). By using software predication, the processor can avoid the pipeline flush that would have been produced by a branch misprediction (i.e., at the cost of fetching the instructions on the wrong-path of the branch). Therefore, if the compiler carefully selects the branches that are predicated, the benefit of predication can overcome the cost of fetching and possibly executing the instructions on the wrong path.

Predication is not without limitations. Specifically, predication requires a fully predicated instruction set architecture (ISA), i.e., visible predicate registers and predicated instructions. Additionally, predication cannot be adaptive to runtime program behavior. That is, if the branch would have been easy-to-predict, the cost of fetching and executing the wrong path is incurred by the processor.

From the foregoing it is appreciated that there exists a need for systems and methods to ameliorate the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject matter described herein allows for systems and methods to detect instances where dynamic predication of indirect jumps (DIP) is considered to be ineffective utilizing data collected on the recent effectiveness of dynamic predication on recently executed indirect jump instructions. In an illustrative implementation, a computing environment comprises a DIP monitoring engine and an instruction set comprising at least one indirect jump instruction that triggers access to the DIP monitoring engine (i.e., in the form of a DIP monitoring table) representative of recently executed jump instructions.

In an illustrative operation, the exemplary DIP monitoring engine collects and processes historical data on DIP instances, where, illustratively, a monitored instance can be categorized according to one or more selected classifications. In the illustrative operation, a comparison is performed for currently monitored indirect jump instructions using the collected historical data (and classifications) to determine whether DIP should be invoked by the computing environment or to invoke other indirect jump prediction paradigms.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative illustrations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

Overview: Indirect Jumps:

The herein described systems and methods aim to ameliorate the shortcomings of existing practices by improving the performance of how a processor handles indirect jump instructions. Generally, indirect jump instructions can be found in computer programs, and especially frequently in those written in object-oriented languages such as C#, Java, and C++. In practice, to support polymorphism, these languages include virtual function calls that are implemented using indirect jump instructions in the instruction set architecture of a processor. These and other computing languages also implement common code constructs including "switch statements," "jump tables," and "interface calls" using indirect jump instructions. Specifically, an indirect jump instruction changes the program control flow to a location designated in its argument, which could be a register or memory location. Currently deployed object-oriented languages result in significantly more indirect jumps than traditional languages. In addition to virtual function calls, indirect jumps are commonly used in the implementation of programming language constructs such as switch-case statements, jump tables, and interface calls.

Predication of Indirect Jumps Overview:

Dynamic Hammock Predication (DHP) aims to overcome the limitations of software predication. Operatively, using DHP, hammock branches are marked by the compiler for dynamic predication. When the branch is fetched, the hardware decides between following the branch prediction and dynamically predicating the branch, possibly using a confidence estimator, which keeps information about how that branch has been correctly predicted in the recent past. Generally, DHP does not require a predicated ISA and is adaptive to runtime program behavior, but it is only applicable to non-complex hammock branches. The diverge-merge processor (DMP) extends the benefit of dynamic predication to complex control-flow graphs, including nested and complex hammocks and loops, based on the observation that even though not every path after a branch re-converges in a complex control-flow graph (CFG), that frequently-executed paths usually re-converge.

Dynamic predication as implemented in DMP is a cooperative compiler-micro-architecture solution. Operatively, the compiler selects the candidate branches using control-flow analysis and profiling, and marks them in the executable binary along with the control-flow merge (CFM) points where the control independent path starts. When the candidate branch is fetched, the processor checks the confidence estimation associated with the branch prediction and decides whether or not to predicate. If the branch is hard to predict (i.e., it has low confidence), the processor fetches and executes both paths of the branch, guarding the instructions with the corresponding predicate register. On each path, the processor follows the outcomes of the branch predictor, i.e., the most frequently executed paths. These predicate registers are only used at the micro-architectural level; thus the ISA does not have to be predicated. When both paths reach a CFM point, the processor inserts select-micro-ops to reconcile register values produced on either side of the branch, and then the processor continues fetching and executing from a single path.

However, neither DHP nor DMP can handle the predication of indirect jumps since indirect jumps may have a potentially large set of possible targets, and the targets of an indirect jump might not be available at compile time. Stated differently, dynamic predication of indirect jumps requires determining target selection in addition to handling dynamic predication of conditional branches which DHP and DMP are not equipped to handle.

Traditionally, predication assumes that there are exactly two possible next instructions after a branch. Thus, only conditional branches can be predicated because this assumption does not hold for indirect jumps. As described, indirect jumps are used to implement virtual function calls, switch-case statements, jump tables and interface calls, i.e., programming constructs that can redirect the control flow to one of multiple targets. Even though there could be many different targets, usually only a few targets are concurrently used in each phase of the program. If these targets are complexly interleaved, it can be difficult to predict exactly the correct target of an indirect jump. It is, however, less difficult to identify a small set of most likely targets that includes the correct target. Based on this observation, dynamic predication has recently been deployed to handle indirect jumps much like the processing performed in the dynamic predication of conditional branches (DMP).

Generally, dynamic predication of indirect jumps can be realized by satisfying the following conditions. First, determining which indirect jumps are candidates for dynamic predication (DIP-jumps). As with DMP, this can be performed by the compiler, using control-flow analysis to find the CFM point, and performing "profiling" to determine the indirect jumps that are highly mis-predicted.

Second, determining which targets should be predicated. This can be done by the compiler—based on profiling information—or by the computing environment hardware—based on runtime information. Changes in runtime input set, phase behavior of the program and the control-flow path leading to the indirect jump may change the correct target. Since the compiler does not have access to such dynamic information, the hardware can select the most likely targets more accurately than the compiler.

Generally, dynamic predication can contribute to an increase in the performance of a computing environment processor and can be attributed to the fact that dynamic predication operates to avoid full pipeline flushes caused by jump mis-predictions. In the case of indirect jumps, DIP can improve performance with respect to an indirect jump predictor if the processor selects the correct target as one of the targets to predicate, and the jump is mis-predicted.

Dynamic predication instances can be classified into four cases based on whether or not the correct target is predicated and whether or not the jump was actually mispredicted: (1) "Useful (U)"—A dynamic predication instance is useful (i.e., successfully avoids a pipeline flush) if it predicates the correct target and the jump was originally mis-predicted; (2) "Neutral (N)"—If the jump was mis-predicted but DIP does not predicate the correct target (i.e., DIP does not have impact on performance; The pipeline is flushed when the jump is resolved, exactly like when the jump is mis-predicted); (3) "Moderately Harmful (MH)"—If the jump was originally correctly predicted and DIP decides to predicate it with the correct target, there is performance degradation due to the overhead of fetching and executing the extra (wrong) path; (4) "Harmful (H)"—The worst case is dynamically predicating a correctly predicted instance of the jump without predicating the correct target. Doing so introduces a new pipeline flush that would not have happened without dynamic predication.

To optimize performance improvement, instances of dynamic predication are desired to be "Useful", and the other three cases are desired to be eliminated. DIP relies on two mechanisms to maximize the "Useful" case, where it can actually improve performance. DIP uses a confidence estimator to try to predicate only when the jump is mis-predicted. A currently deployed confidence estimator is the enhanced JRS confidence estimator, which, operatively, uses a saturating counter that is incremented when the jump is correctly predicted and reset when the jump is mis-predicted. The confidence on the jump prediction is high if the counter is above a predetermined threshold. Isolated jump mis-predictions reset the confidence estimator and produce low confidence for the next sequence of predictions that happen under the same context (branch history). Therefore, when mis-predictions are infrequent, the confidence estimator can identify many correct predictions as low confidence (i.e. it has many false positives). Current processors use the Branch Target Buffer (BTB) to predict indirect jumps. Since the BTB predicts the last seen target of each jump, mis-predictions are very common and the confidence estimator achieves reasonable accuracy. However, confidence estimation accuracy is considerably reduced when more accurate indirect jump predictors are used.

Additionally, to increase the likelihood of predicating the correct target, DIP uses accurate dynamic target selection hardware. Illustratively, the target selection hardware can be a cache that can track most frequently executed targets in the recent past for the context of the indirect jumps (e.g., branch history and/or path information). Operatively, if the processor decides to predicate an instance of the jump, the target selection hardware can choose the two most frequently executed targets to predicate. Even though this mechanism is more accurate than previously proposed indirect jump predictors that require much larger storage, it still fails to choose the correct target for some applications, mainly because of misses in the target selection cache.

The herein described systems and methods aim to ameliorate the shortcomings of existing practice by detecting the instances where DIP is not likely to be effective in handling an indirect jump and to prevent the processor from using dynamic predication in those instances. Illustratively, a feedback mechanism is described that directs the use of dynamic predication for an indirect jump instruction based on the past usefulness of dynamic predication.

Figure 1:
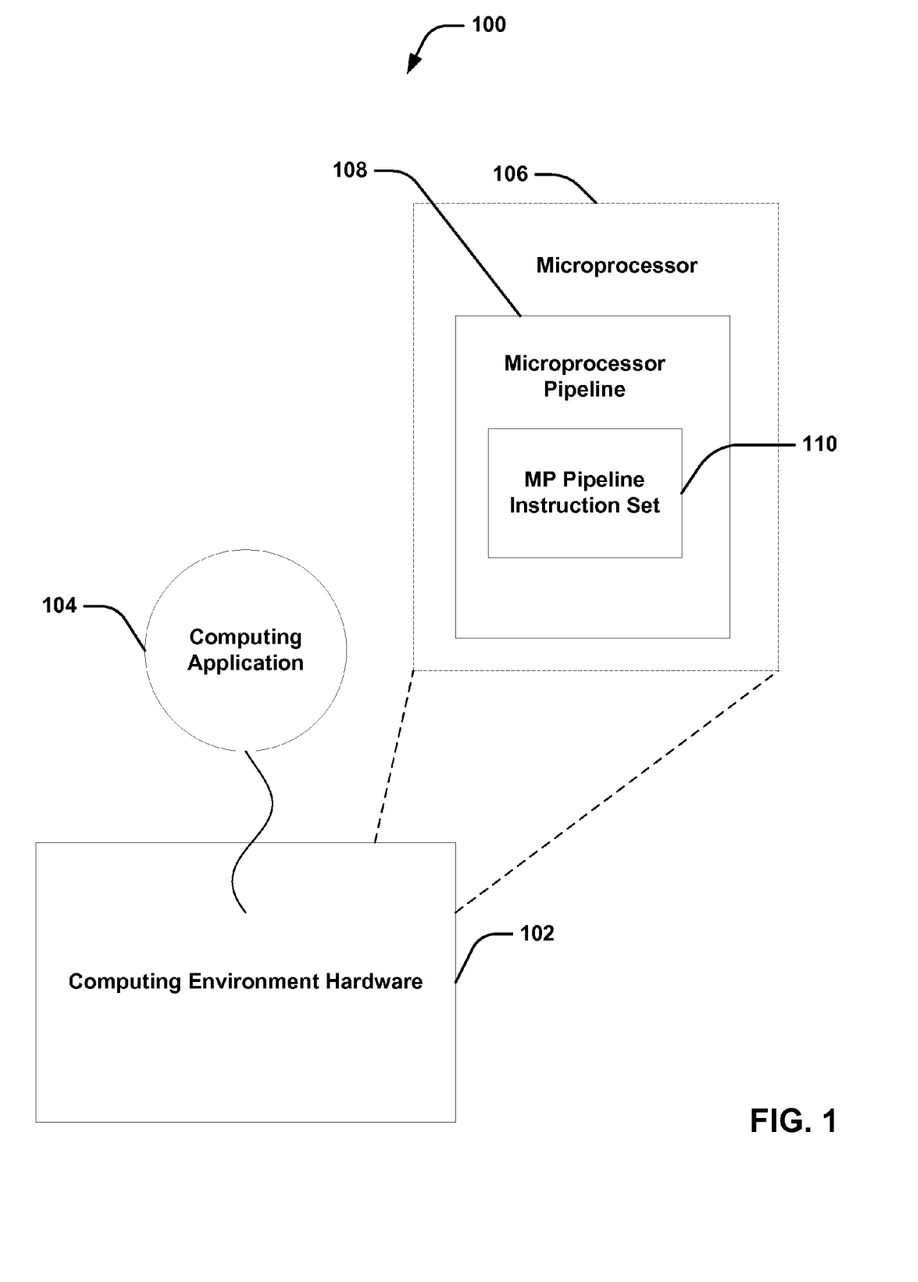
FIG. 1 is a block diagram of one example of a computing environment performing indirect jumps in accordance with the herein described systems and methods.

Computing Environment with Indirect Jumps:

FIG. 1 describes an exemplary computing environment 100 executing an exemplary computing application utilizing indirect jumps. As is shown in FIG. 1, exemplary computing environment 100 comprises computing environment hardware 102 executing computing application 104. Further, as is shown in FIG. 1, computing environment hardware 102 can comprise one or more microprocessor areas 106 further comprising microprocessor pipeline 108 and microprocessor pipeline instruction set 110.

In an illustrative operation, computing environment hardware 102 can execute computing application 104 which can be an object oriented computing application (or other software application) executing one or more indirect jump instructions on microprocessor pipeline 108.

Figure 2:
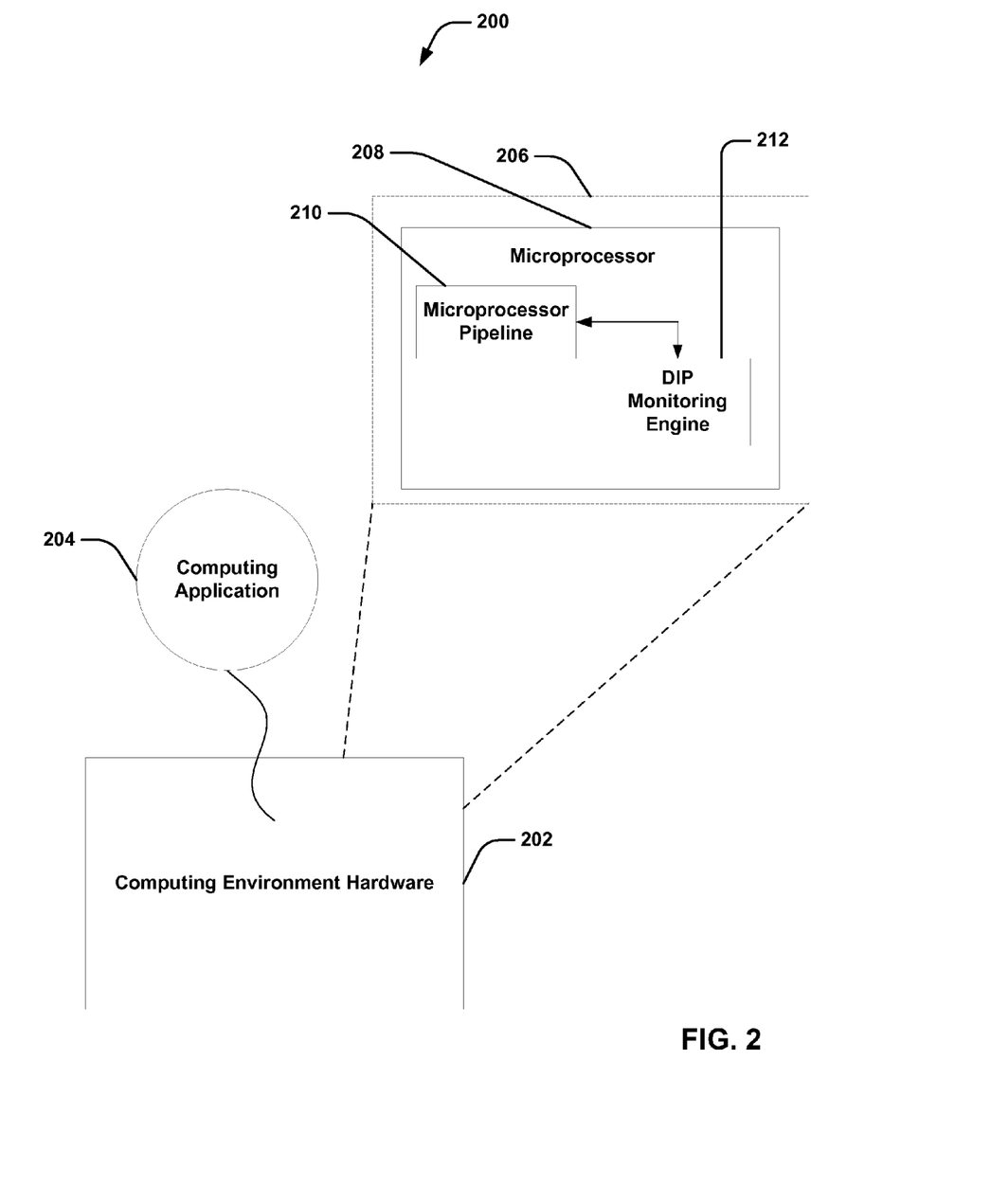
FIG. 2 is a block diagram of one example of a computing environment having indirect dynamic predication of indirect jumps capabilities in accordance with the herein described systems and methods.

FIG. 2 describes an exemplary computing environment 200 executing an exemplary computing application utilizing indirect jumps and comprising a dynamic predication engine to provide instructions to the microprocessor pipeline regarding whether to invoke dynamic predication for an indirect jump. As is shown in FIG. 2, exemplary computing environment 200 comprises computing environment hardware 202 executing computing application 204. Further, as is shown in FIG. 2, computing environment hardware 202 can comprise processing area 206 further comprising microprocessor 208 which further comprises microprocessor pipeline 210 and DIP monitoring engine 212.

In an illustrative operation, computing environment hardware 202 can execute computing application 204 which can be an object oriented computing application (or other software application) executing one or more indirect jumps on microprocessor pipeline 210. Microprocessor pipeline 210 can illustratively operate to handle the one or more indirect jumps deployed by exemplary computing application 204 using microprocessor pipeline 210 and dynamic predication engine 212. Further, in the illustrative operation, DIP monitoring engine 212 can process data representative of the indirect jumps executed on microprocessor pipeline 210 to provide one or more characterizations to the microprocessor pipeline used to determine whether to invoke dynamic predication for a given indirect jump.

In an illustrative implementation, dynamic predication engine 212 can execute one or more algorithms to facilitate the processing of indirect jumps. In the illustrative implementation, microprocessor 208 can operatively monitor the dynamic predication cases with four counters (e.g., one or more microprocessor registers operative in DIP monitoring engine 212) having exemplary classifications: "Useful", "Neutral," "Moderately Harmful" and "Harmful." In the illustrative implementation, initially, the four exemplary counters are set to zero.

In the illustrative operation, as part of the illustrative monitoring operation, microprocessor 208 can determine the processing events that occurred after each instance of dynamic predication mode. For example, after an indirect jump is resolved, the processor operatively monitors the following data: (1) whether the jump was actually mis-predicted, and (2) whether the correct target was actually predicated using dynamic predication. Based on the values of these two pieces of information, the following case can result: (a) if both (1) and (2) are true, the dynamic predication mode was useful. Therefore, microprocessor 208 increments the "Useful" counter, indicating that one more instance of dynamic predication was useful for performance; (b) if (1) is true, but (2) is false, the microprocessor 208 increments the "Neutral" counter; (c) if (1) is false, but (2) is true, the processor increments the "Moderately Harmful" counter; and (d) if both (1) and (2) are false, the processor increments the "Harmful" counter.

In the illustrative implementation, microprocessor 208 can utilize this collected information to decide whether or not to use dynamic predication for a jump instruction. After the microprocessor 208 fetches an indirect jump instruction and estimates it to be low-confidence, the microprocessor 208 can check whether or not the "Useful" counter is predominant compared to the "Harmful" and "Moderately Harmful counters." Preferably, the processor uses dynamic predication (i.e., enters dynamic predication mode) for the jump if the useful case is predominant with respect to the harmful cases.

In the illustrative operation, when microprocessor 208 processor (cooperating with dynamic predication engine 212) fetches an indirect jump instruction and receives a low-confidence rating from dynamic predication engine 212, microprocessor 208 can operatively calculate the following equation:

$$\text{Useful} > A * \text{Harmful} + B * \text{Moderately Harmful} \quad \text{EQUATION 1}$$

where A and B are hardcoded constant values (e.g., integer or floating point) as set in microprocessor 208. A and/or B can possibly be zero, in which case some of the counters are not considered in the expression.

There are two cases based on the evaluation of Equation: TRUE—if Equation 1 evaluates to true (i.e., "Useful" counter is predominant), then microprocessor 208 dynamically predicates the jump instruction (instead of simply using the baseline mechanism for handling indirect jumps); FALSE—if Equation 1 evaluates to false for an indirect jump, then the jump is not dynamically predicated. Instead, microprocessor 208 can illustratively fall back to a baseline mechanism to handle the indirect jump instruction. For example, it can use the predicted target from the indirect jump predictor to perform speculative execution on the jump. Alternatively, in another illustrative operation, microprocessor 208 can stall microprocessor pipeline 210 until the jump instruction's target address is resolved (i.e., calculated) in the back-end of microprocessor pipeline 210.

In the illustrative implementation, initially (i.e., when microprocessor 208 is reset, or when a context switch occurs on the processor), the counters (Useful, Neutral, Moderately Harmful, and Harmful) are set to zero. Further, the four counters are updated as described herein. In the instance dynamic predication is not employed (i.e., Equation 1 evaluates to FALSE) for an indirect jump, microprocessor 208 can operatively update the counters to collect information about the usefulness of dynamic predication.

In an illustrative implementation, when computing application 204 starts, the counters (e.g., operative in DIP monitoring engine 212) might not have reached a stable state where their information is reliable (i.e., the counters might not yet have enough fidelity). As a measure to ensure that incorrect decisions about dynamic predication are not provided to microprocessor pipeline 210, DIP monitoring engine 212 operatively executes Equation 1 if the sum of all four case counters is greater than a threshold C. Stated differently, Equation 1 is utilized if the following equation holds true:

$$\text{Useful} + \text{Neutral} + \text{Moderately Harmful} + \text{Harmful} > C \quad \text{EQUATION 2}$$

where C is preferably a hard-coded constant value (e.g., integer or floating point) provided in microprocessor 208.

It is appreciated that although the herein described systems and methods contemplate a summation operation (as described in EQUATION 2) to identify a threshold that such description is merely illustrative as other arithmetic/logic operations can be performed to determine the threshold including but not limited to subtraction, multiplication, division, and hashing.

In an illustrative implementation, to account for the change of behavior of computing application 204 over time, the information on the counters is kept current, reducing the effect of old dynamic predication instances and giving more importance to recent dynamic predication instances. In an illustrative operation, DIP monitoring engine 212 can scale down the counters to allow them to correctly track the current phase of the program. In the illustrative operation, DIP monitoring engine 212 can deploy an aging mechanism by right shifting the case counters every N dynamic indirect jump instances (or possibly every M cycles). In another illustrative operation, DIP monitoring engine 212 can reset the counters at periodic time intervals (e.g., possibly after N dynamic predication instances or after every M cycles).

Figure 3:
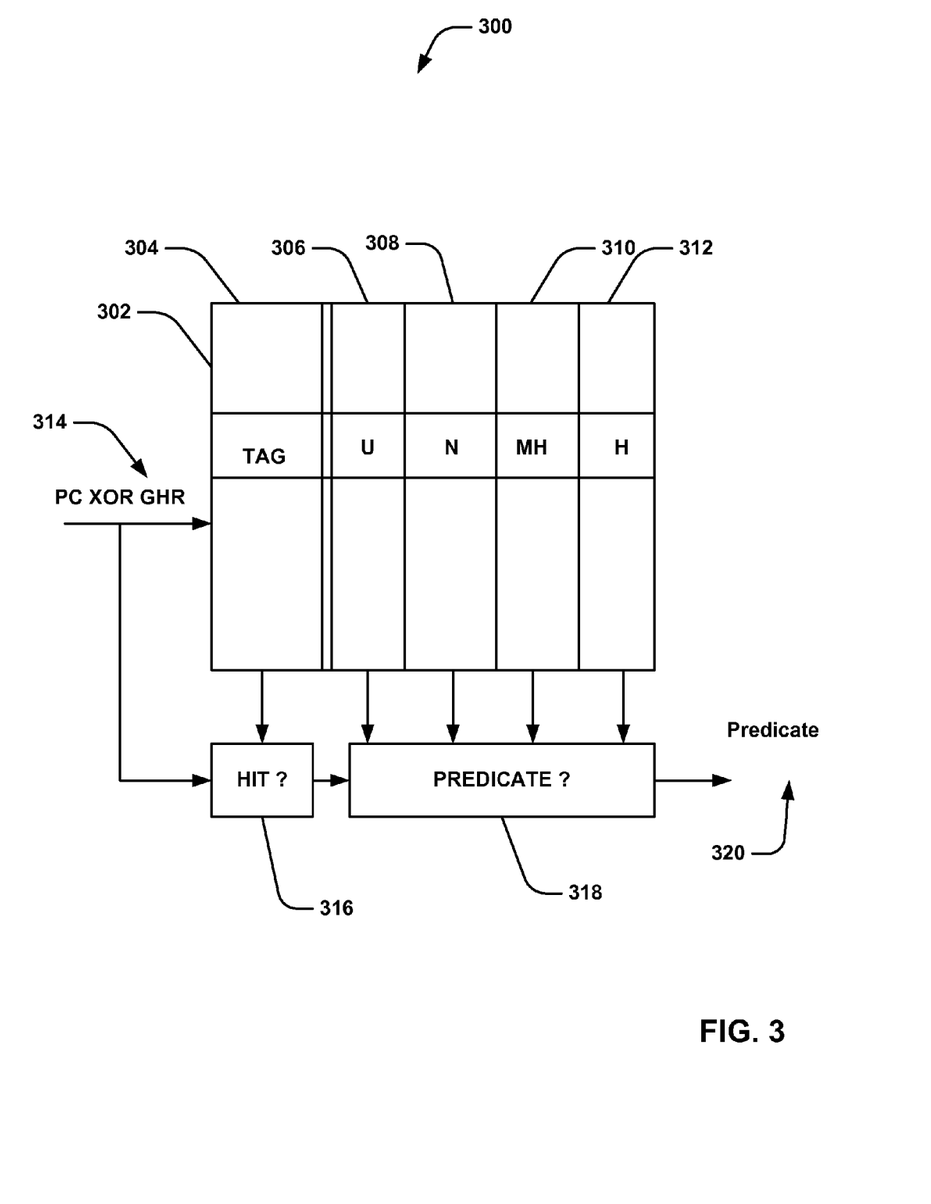
FIG. 3 is a block diagram of an exemplary data flow of an exemplary computing environment operative to utilize and process historical DIP data in handling indirect jump instructions in accordance with the herein described systems and methods.

FIG. 3 schematically illustrates the monitoring of dynamic predications of indirect jumps occurring in dynamic predication environment 300. As is shown in FIG. 3, dynamic predication environment 300 comprises DIP monitoring table 302 (e.g., Feedback Table), XOR mechanism 314, tag comparison logic (e.g., HIT mechanism) 316, predication decision logic 318, and predicate 320. Additionally, DIP monitoring table 304 comprises entries representative of tags 304 (e.g., tag of the entry in which information about an indirect jump is kept), "Useful" counter 306, "Neutral" counter 308, "Moderately Harmful" counter 310, and "Harmful" counter 312.

In an illustrative implementation, predication decision logic 318 can operatively deploy a decision algorithm based on EQUATIONS 1 and 2 described herein. In an illustrative operation, the output of predicate identifier 318 can be a data representative of a decision of whether or not to dynamically predicate a particular instance of an indirect jump. Such decision can illustratively depend on the existence of an entry in DIP monitoring table 302 that asserts tag comparison logic table 316 (HIT) and the values of counters "Useful" 306, "Neutral" 308, "Moderately Harmful" 310, and "Harmful" 312 for that particular entry. Illustrative processing performed by the decision algorithm is further described in FIG. 4.

In an illustrative implementation, DIP monitoring table 302 (e.g., a computing environment hardware component/structure) operatively stores counters "Useful" 306, "Neutral" 308, "Moderately Harmful" 310, and "Harmful" 312. In the illustrative implementation, microprocessor (not shown) can access DIP monitoring table 302 when it fetches an indirect jump instruction that carries a low confidence. DIP monitoring table 302 can be illustratively implemented as a set-associative cache structure or a content addressable associative memory.

In an illustrative operation, microprocessor (not shown) accesses DIP monitoring table 302 using an exemplary program counter (PC) of the indirect jump hashed with a microprocessor state that provides information about the program context. In the illustrative operation, the PC is XORed with the global branch history register (GHR), to operatively form an index into DIP monitoring table 302. Alternative illustrative implementations can use other context information, including but not limited to path history, local history registers, and values of other processor registers and state. Alternative illustrative implementations can also use other hashing functions than XOR including but not limited to shifting-and-XORing, or folding-and-XORing, addition, subtraction, division, and multiplication.

Figure 4:
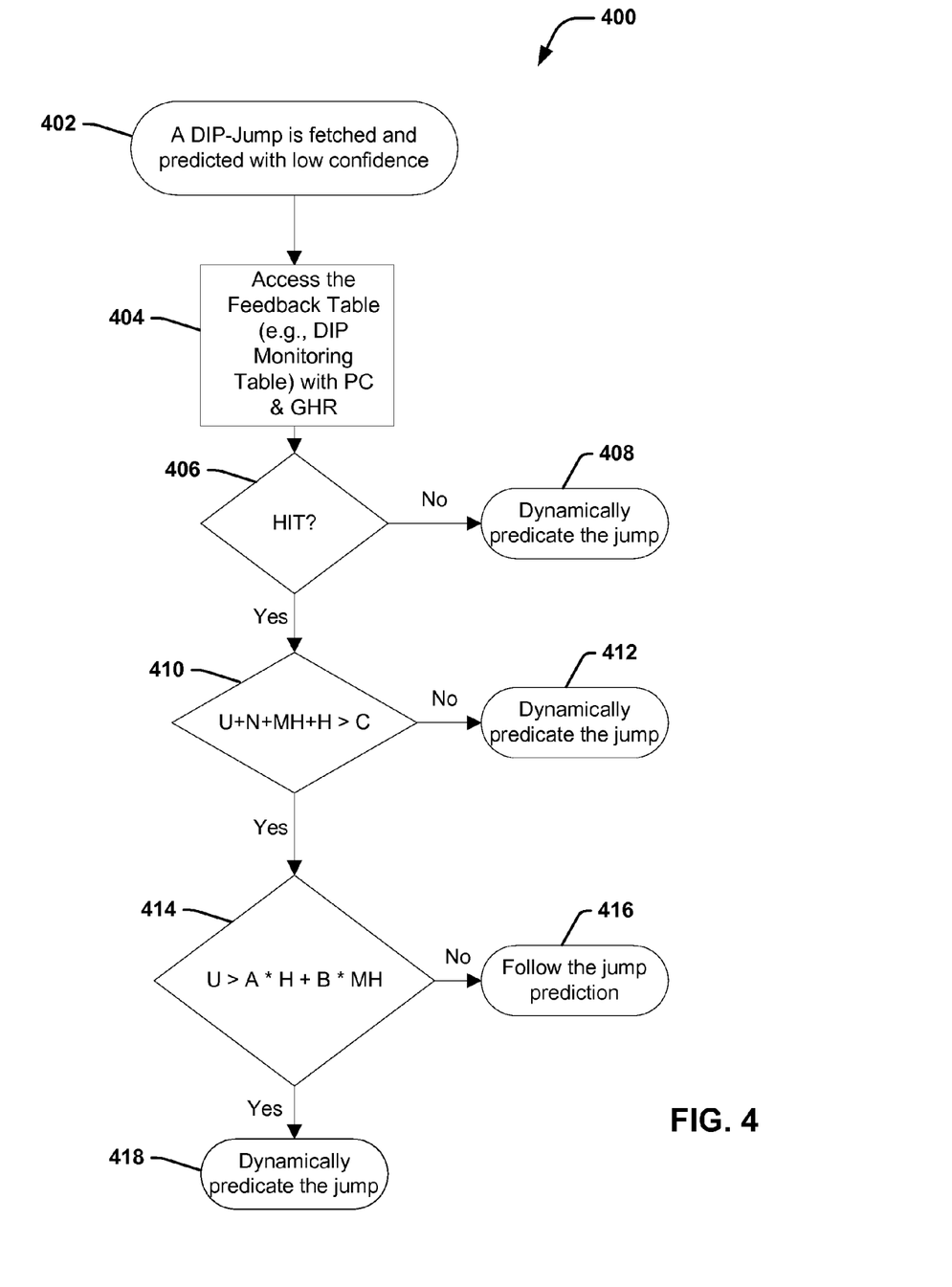
FIG. 4 is a flow diagram of one example of a method for directing the invocation of DIP using aggregated DIP historical data in accordance with the herein described systems and methods.

FIG. 4 is a flow diagram of one method 400 of processing dynamic predications of indirect jumps by a computing environment. As is shown processing begins at block 402 where a DIP jump is fetched and predicted with low confidence. Processing then proceeds to block 404 where the Feedback table (e.g., DIP monitoring table) is accessed using PC and GHR data values. Processing then proceeds to block 406 where a check is performed to determine whether an entry in the Feedback table is found. If the check at block 406 indicates that an entry is not found, processing proceeds to block 408 where the jump is dynamically predicated.

However, if the check at block 406 indicates that an entry is found in the Feedback table, processing proceeds to block 410 where a second check is performed according to EQUATION 2 (as described herein) where a comparison of sum of the values of characteristic counters "Useful"—U, "Neutral"—N, "Moderately Harmful"—MH, and "Harmful"—H against a selected constant is performed. If the check at block 410 indicates that the sum of the U, N, MH, and H counters is less than the selected constant value C, processing proceeds to block 412 where the jump is dynamically predicated.

However, if the check at block 410 indicates that the sum of the U, N, MH, and H counters is greater than the selected constant value C, processing proceeds to block 414 where a check is performed according to EQUATION 1 (as described herein) to determine whether the value of the U counter is greater than the sum of two products representative of the value of the H counter multiplied by a selected constant A and the value of the MH counter multiplied by a selected constant B. If the check at block 414 indicates that the value of the U counter is not greater than the sum of the products, processing proceeds to block 416 where a jump prediction is followed. However, if the check at block 414 indicates that the value of the U counter is greater than the sum of the products, processing proceeds to block 418 where the jump is dynamically predicated.

In an illustrative implementation, if the Feedback table access results in a miss (i.e. not hit) or if Equation 2 is FALSE, then microprocessor can operatively dynamically predicate the jump. An alternative illustrative implementation can operatively decide not to dynamically predicate the jump in these cases.

Figure 5:
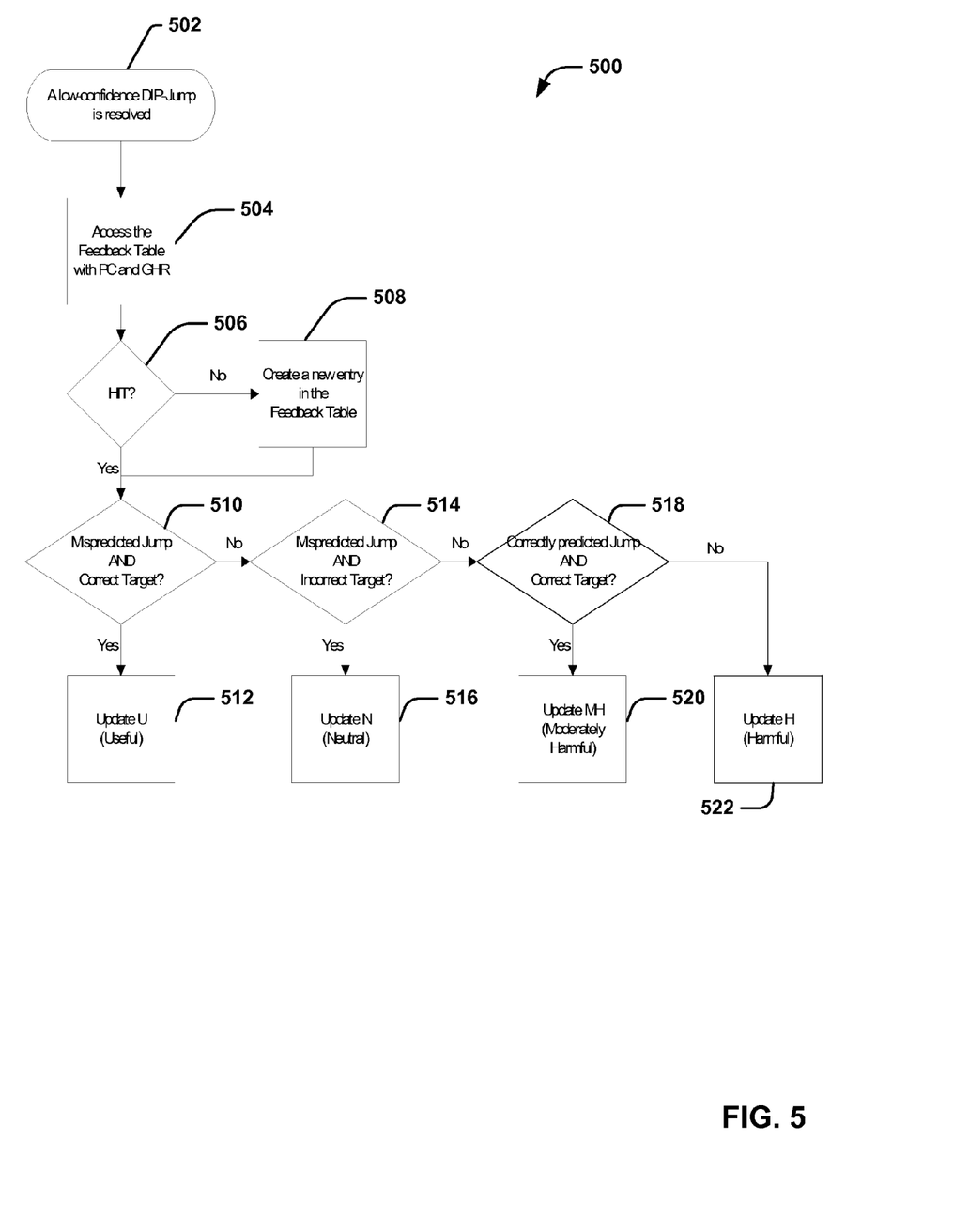
FIG. 5 is a flow diagram of one example of a method for collecting and classifying DIP data in accordance with the herein described systems and methods.

FIG. 5 is a flow diagram of one example of a method 500 where a low-confidence DIP-jump is committed by the microprocessor pipeline. As is shown in FIG. 5, processing beings at block 502 where a low confidence DIP jump is resolved. Processing then proceeds to block 504 where the Feedback table is accessed with PC and GHR values. A check is then performed at block 506 to determine if there is a hit in the Feedback table (i.e., an entry in the Feedback table for the indirect jump), If the check at block 506 indicates that there is no hit, processing proceeds to block 508 where a new entry in the Feedback table is created. Processing then proceeds to block 510 and continues from there.

However, if the check at block 506 indicates that a hit has occurred (an entry is present in the Feedback table for the indirect jump), processing proceeds to block 410 where a check is performed to determine if the data entry for the indirect jump represents a mis-predicted jump and correct target. If the check at block 510 returns yes, processing proceeds to block 512 where the "Useful"—U counter is updated, otherwise, processing proceeds to block 514, where a check is performed to determine whether the data entry for the indirect jump represents a mis-predicted jump and incorrect target. If the check at block 514 returns yes, processing proceeds to block 516 where the "Neutral"—N counter is updated, otherwise, processing proceeds to block 518 where a check is performed to determine if the data entry for the indirect jump represents a correctly predicted jump and a correct target. If the check at block 518 returns a yes, processing proceeds to block 520 where the "Moderately Harmful"—MH counter is updated, otherwise, processing proceeds to block 522 where the "Harmful"—H counter is updated.

In an illustrative implementation, if the Feedback table access results in a miss (i.e. not hit), then a microprocessor processor can operatively allocate an entry for the indirect jump in the Feedback table and update the entry using the information about the jump. Alternative illustrative implementation can use other heuristics to decide whether or not to allocate an entry for an indirect jump in the Feedback table. Based on information about the prediction and dynamic predication of the jump, the four case counters can be updated.

Figure 6:
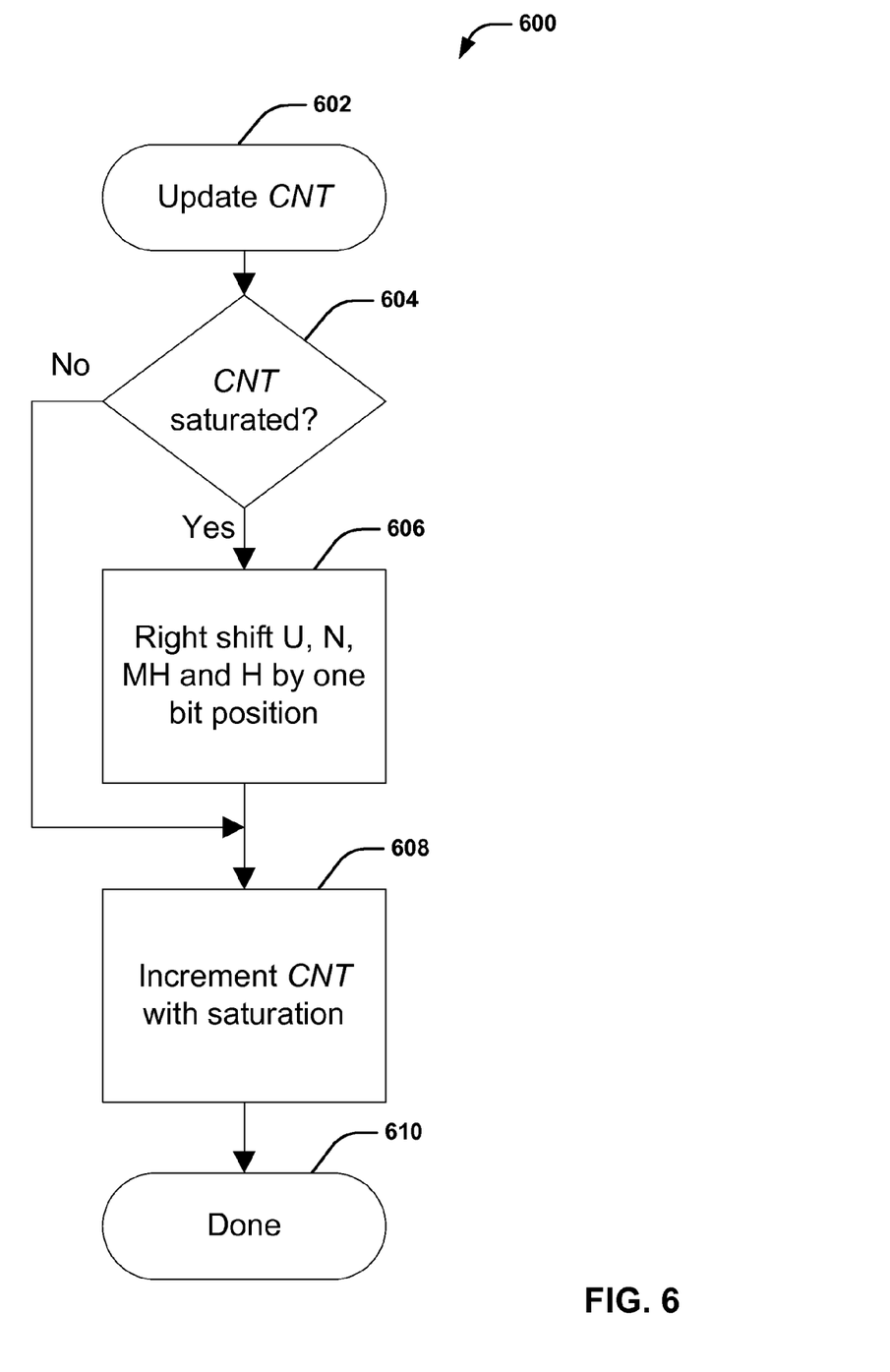
FIG. 6 is a flow diagram of one example of a method for the processing performed to ensure historical DIP data is refreshed in accordance with the herein described systems and methods.

FIG. 6 is a flow diagram of one example of method 600 for updating the classification counters as described herein. As is shown in FIG. 6, processing begins at block 602 where an update counter command is invoked. A check is then performed at block 604 to determine if the counter to be updated is saturated. If the check at block 604 indicates that the counter to be updated is not saturated, processing proceeds to block 608 and continues from there.

However, if the check at block 604 indicates that the counter to be updated is saturated, processing proceeds to block 606 where a right shift is performed on all four counters (U, N, MH and H), illustratively, by one bit position. Processing then proceeds to block 608 where the counter to be updated is incremented with saturation. Processing then terminates at block 610.

The methods can be implemented by computer-executable instructions stored on one or more computer-readable media or conveyed by a signal of any suitable type. The methods can be implemented at least in part manually. The steps of the methods can be implemented by hardware, software or combinations of software and hardware and in any of the ways described above. The computer-executable instructions can be the same process executing on a single or a plurality of microprocessors or multiple processes executing on a single or a plurality of microprocessors. The methods can be repeated any number of times as needed and the steps of the methods can be performed in any suitable order.

The subject matter described herein can operate in the general context of computer-executable instructions, such as program modules, executed by one or more components. Generally, program modules include routines, programs, objects, data structures, etc., that perform particular tasks or implement particular abstract data types. Typically, the functionality of the program modules can be combined or distributed as desired. Although the description above relates generally to computer-executable instructions of a computer program that runs on a computer and/or computers, the user interfaces, methods and systems also can be implemented in combination with other program modules. Generally, program modules include routines, programs, components, data structures, etc. that perform particular tasks and/or implement particular abstract data types.

Moreover, the subject matter described herein can be practiced with most any suitable computer system configurations, including single-processor or multiprocessor computer systems, mini-computing devices, mainframe computers, personal computers, stand-alone computers, hand-held computing devices, wearable computing devices, microprocessor-based or programmable consumer electronics, and the like as well as distributed computing environments in which tasks are performed by remote processing devices that are linked through a communications network. In a distributed computing environment, program modules can be located in both local and remote memory storage devices. The methods and systems described herein can be embodied on a computer-readable medium having computer-executable instructions as well as signals (e.g., electronic signals) manufactured to transmit such information, for instance, on a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing some of the claims.

It is, of course, not possible to describe every conceivable combination of components or methodologies that fall within the claimed subject matter, and many further combinations and permutations of the subject matter are possible. While a particular feature may have been disclosed with respect to only one of several implementations, such feature can be combined with one or more other features of the other implementations of the subject matter as may be desired and advantageous for any given or particular application.

Moreover, it is to be appreciated that various aspects as described herein can be implemented on portable computing devices (e.g., field medical device), and other aspects can be implemented across distributed computing platforms (e.g., remote medicine, or research applications). Likewise, various aspects as described herein can be implemented as a set of services (e.g., modeling, predicting, analytics, etc.).

Figure 7:
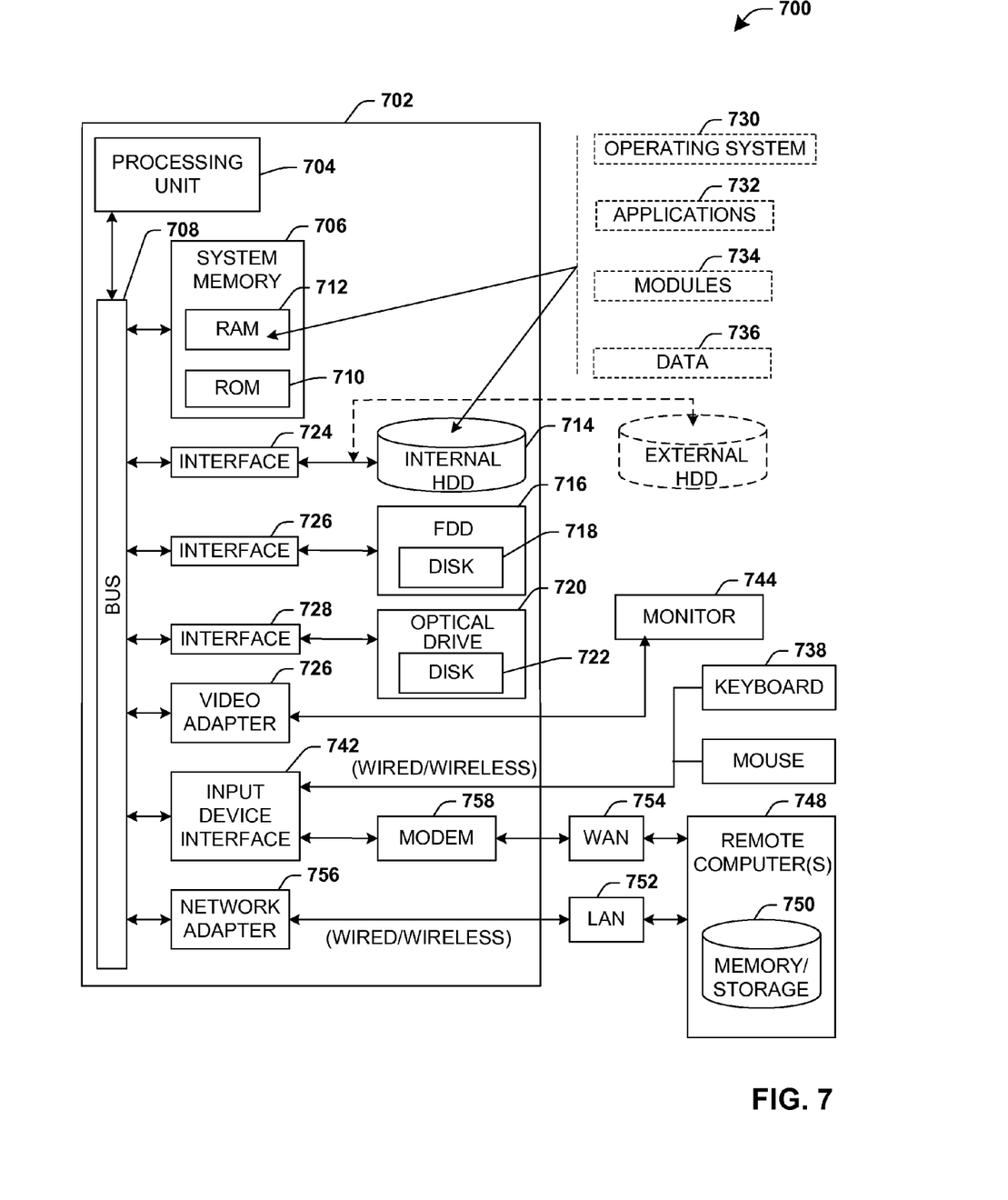
FIG. 7 is an example computing environment in accordance with various aspects described herein.

FIG. 7 illustrates a block diagram of a computer operable to execute the disclosed architecture. In order to provide additional context for various aspects of the subject specification, FIG. 7 and the following discussion are intended to provide a brief, general description of a suitable computing environment 700 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

More particularly, and referring to FIG. 7, an example environment 700 for implementing various aspects as described in the specification includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the specification can be implemented with various commercially available operating systems or combinations of operating systems.

A user can enter commands and information into the computer 702 through one or more wired/wireless input devices, e.g., a keyboard 738 and a pointing device, such as a mouse. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 726. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the input device interface 742. In a networked environment, program modules depicted relative to the computer 702, or portions thereof, can be stored in the remote memory/storage device 750. It will be appreciated that the network connections shown are example and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
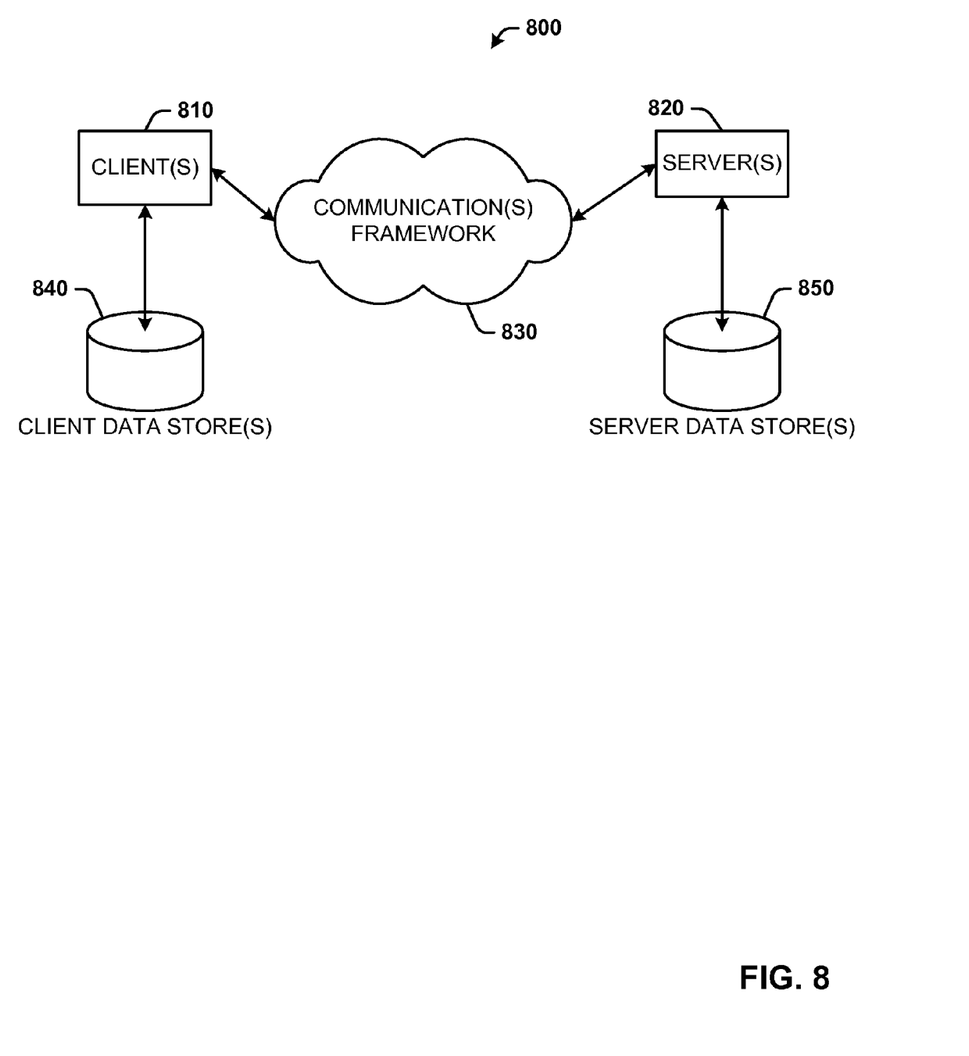
FIG. 8 is an example networked computing environment in accordance with various aspects described herein.

Referring now to FIG. 8, there is illustrated a schematic block diagram of an exemplary computing environment 800 in accordance with the subject invention. The system 800 includes one or more client(s) 810. The client(s) 810 can be hardware and/or software (e.g., threads, processes, computing devices). The client(s) 810 can house cookie(s) and/or associated contextual information by employing the subject invention, for example. The system 800 also includes one or more server(s) 820. The server(s) 820 can also be hardware and/or software (e.g., threads, processes, computing devices). The servers 820 can house threads to perform transformations by employing the subject methods and/or systems for example. One possible communication between a client 810 and a server 820 can be in the form of a data packet adapted to be transmitted between two or more computer processes. The data packet may include a cookie and/or associated contextual information, for example. The system 800 includes a communication framework 830 (e.g., a global communication network such as the Internet) that can be employed to facilitate communications between the client(s) 810 and the server(s) 820.

Communications can be facilitated via a wired (including optical fiber) and/or wireless technology. The client(s) 810 are operatively connected to one or more client data store(s) 840 that can be employed to store information local to the client(s) 810 (e.g., cookie(s) and/or associated contextual information). Similarly, the server(s) 820 are operatively connected to one or more server data store(s) 850 that can be employed to store information local to the servers 820.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. is:

What is claimed

1. A system to facilitate dynamic predications of indirect jumps in a computing environment, comprising at least one hardware processor coupled to at least one machine-readable storage medium storing instruction executable by the least one hardware processor to implement:

a dynamic predication of indirect jumps (DIP) monitoring engine that utilizes data about previously executed jump instructions to direct the computing environment to invoke dynamic predication, a DIP monitoring engine configured to monitor the data stored in the DIP monitoring table, and including a prediction decision mechanism configured to invoke dynamic prediction base on the data;

wherein the DIP monitoring table includes a plurality of counters to hold counts of respective classifications of processing events occurring after each occurrence of a dynamic predication mode, for determining whether to invoke dynamic predication for an indirect jump based on conditions applying to a previous indirect jump after the previous indirect jump is resolved, the counters including a first counter to be incremented if the previous indirect jump was mis-predicted and a correct target for the previous indirect jump was predicated using dynamic predication;

a second counter to be incremented if the previous indirect jump was mis-predicted and a correct target for the previous indirect jump was predicated using dynamic predication;

a third counter to be incremented if the previous indirect jump was mis-predicted and a correct target for the previous indirect jump was predicated using dynamic predication; and a fourth counter to be incremented if the previous indirect jump was mis-predicted and a correct target for the previous indirect jump was predicated using dynamic predication; and wherein the predication decisions mechanism is configured to invoke the dynamic predication based on values of the counters.

2. The system as recited in claim 1, further comprising an XOR mechanism configured to form an index into the DIP monitoring table.

3. The system as recited in claim 1, wherein the plurality of counters include a plurality of registers.

4. The system as recited in claim 1, wherein the predication decision mechanism is configured to compare a result of an arithmetic/logical operation on the values of the counters with a threshold value.

5. The system as recited in claim 1, wherein the DIP monitoring engine is further configured to process data representative of a program context and indirect jumps, including at least one of program counter (PC) data or global branch history register (GHR) data.

6. The system as recited in claim 1, wherein the predication decision mechanism is configured to compare a results of an airthmetic/logical operation on the values of the counters with a selected valued representative of one or more operational characteristics of the computing environment.

7. The system as recited in claim 1, wherein the DIP monitoring engine is further configured to process data representative of one or more selected values representative of operational specifications of the computing environment.

8. The system as recited in claim 1, wherein the DIP monitoring table comprises a set-associative cache structure.

9. The system as recited in claim 1, wherein the DIP monitoring table comprises a content addressable associative memory.

10. The system as recited in claim 1, wherein the DIP monitoring engine is operable in a microprocessor of the computing environment.

11. A method for facilitating dynamic predication of one or more indirect jumps (DIP), comprising: resolving a target address of an indirect jump instruction; based on the resolving, determining which of a set of conditions applies to a resolved indirect jump corresponding to the resolved indirect jump instruction, the set of conditions including (i) the resolved indirect jump was mis-predicted and a correct target address for the resolved indirect jump was predicated using dynamic predication, (ii) the resolved indirect jump was mis-predicted and a correct target address for the resolved indirect jump was not predicated using dynamic predication, (iii) the resolved indirect jump was not mis-predicted and a correct target address for the resolved indirect jump was predicated using dynamic predication, and (iv) the resolved indirect jump was not mis-predicted and a correct target address for the resolved indirect jump was not predicated using dynamic predication; incrementing one of a set of classification registers respectively corresponding to conditions (i)-(iv); comparing a result of an arithmetic/logical operation on the values of the set of classification registers at least one predetermined threshold; and based on the comparing, determining whether to invoke dynamic predication.

12. The method as recited in claim 11, further comprising receiving at least one of data representative of a program context, program counter (PC) data or global branch history register (GHR) data.

13. The method as recited in claim 12, further comprising XOR-ing the PC and the GHR to form an index into a DIP monitoring table associated with the set of classification registers.

14. The method as recited in claim 11, further comprising summing the values of the set of classification registers to perform the comparing.

15. The method as recited in claim 11, further comprising determining whether a value of a first classification register, corresponding to condition (i), is greater than a sum of two products respectively representative of a value of a second classification register, corresponding to condition (iv), multiplied by a selected constant and a value of a third classification register, corresponding to condition (iii), multiplied by another selected constant.

16. The method as recited in claim 11, further comprising comparing a result of an arithmetic/logical operation on the values of the set of classification registers against a selected value representative of one or more operational characteristics of the computing environment.

17. The method as recited in claim 11, further comprising resolving the target address based on a low-confidence indirect jump being executed.

18. The method as recited in claim 11, further comprising updating at least one of the set of classification registers.

19. The method as recited in claim 11, further comprising determining if a register of the set of classification registers is saturated, and if so, right-shifting the register.

20. A non-transitory computer-readable storage medium storing instructions to execute a method for facilitating dynamic predication of one or more indirect jumps (DIP), the method comprising: resolving a target address of an indirect jump instruction; based on the resolving, determining which of a set of conditions applies to a resolved indirect jump corresponding to the resolved indirect jump instruction, the set of conditions including (i) the resolved indirect jump was mis-predicted and a correct target address for the resolved indirect jump was predicated using dynamic predication, (ii) the resolved indirect jump was mis-predicted and a correct target address for the resolved indirect jump was not predicated using dynamic predication, (iii) the resolved indirect jump was not mis-predicted and a correct target address for the resolved indirect jump was predicated using dynamic predication, and (iv) the resolved indirect jump was not mis-predicted and a correct target address for the resolved indirect lump was not predicated using dynamic predication; incrementing one of a set of classification registers respectively corresponding to conditions (i)-(iv); comparing a result of an arithmetic/logical operation on the values of the set of classification registers at least one predetermined threshold; and based on the comparing, determining whether to invoke dynamic predication.

* * * * *

UNITED STATES PATENT AND TRADEMARK OFFICE
CERTIFICATE OF CORRECTION

| | | |
|---|---|---|
| PATENT NO. | : 7,818,551 B2 | |
| APPLICATION NO. | : 11/967336 | |
| DATED | : October 19, 2010 | |
| INVENTOR(S) | : Jose A Joao et al. | |

It is certified that error appears in the above-identified patent and that said Letters Patent is hereby corrected as shown below:

In column 15, line 53, in Claim 1, delete "instruction" and insert -- instructions --, therefor.

In column 15, line 53, in Claim 1, delete "least" and insert -- at least --, therefor.

In column 15, line 56, in Claim 1, delete "engine that utilizes" and insert -- table configured to store --, therefor.

In column 15, line 56, in Claim 1, delete "about" and insert -- representative of an effectiveness of an application of dynamic predication on --, therefor.

In column 15, line 56, in Claim 1, delete "jump" and insert -- one or more indirect jump --, therefor.

In column 15, line 57-58, in Claim 1, delete "instructions to direct the computing environment to invoke dynamic predication," and insert -- instructions; --, therefor.

In column 15, line 60-61, in Claim 1, delete "prediction" and insert -- predication --, therefor.

In column 15, line 62, in Claim 1, delete "prediction base" and insert -- predication based --, therefor.

In column 16, line 10, in Claim 1, before "predicated" insert -- not --.

In column 16, line 13, in Claim 1, before "mis-predicted" insert -- not --.

In column 16, line 17, in Claim 1, before "mis-predicted" insert -- not --.

In column 16, line 18, in Claim 1, before "predicated" insert -- not --.

Signed and Sealed this
Twenty-second Day of March, 2011

David J. Kappos
*Director of the United States Patent and Trademark Office*